No. 828,786. PATENTED AUG. 14, 1906.
G. TICKNER, Jr.
APPARATUS FOR MAKING CIGARETTES.
APPLICATION FILED AUG. 14. 1905.

9 SHEETS—SHEET 1.

Witnesses.
W. Max. Duvall.
Martin T. Fisher.

Inventor.
George Tickner, Jr.,
by Wilkinson & Fisher, Atty

No. 828,786. PATENTED AUG. 14, 1906.
G. TICKNER, Jr.
APPARATUS FOR MAKING CIGARETTES.
APPLICATION FILED AUG. 14, 1905.
9 SHEETS—SHEET 2.
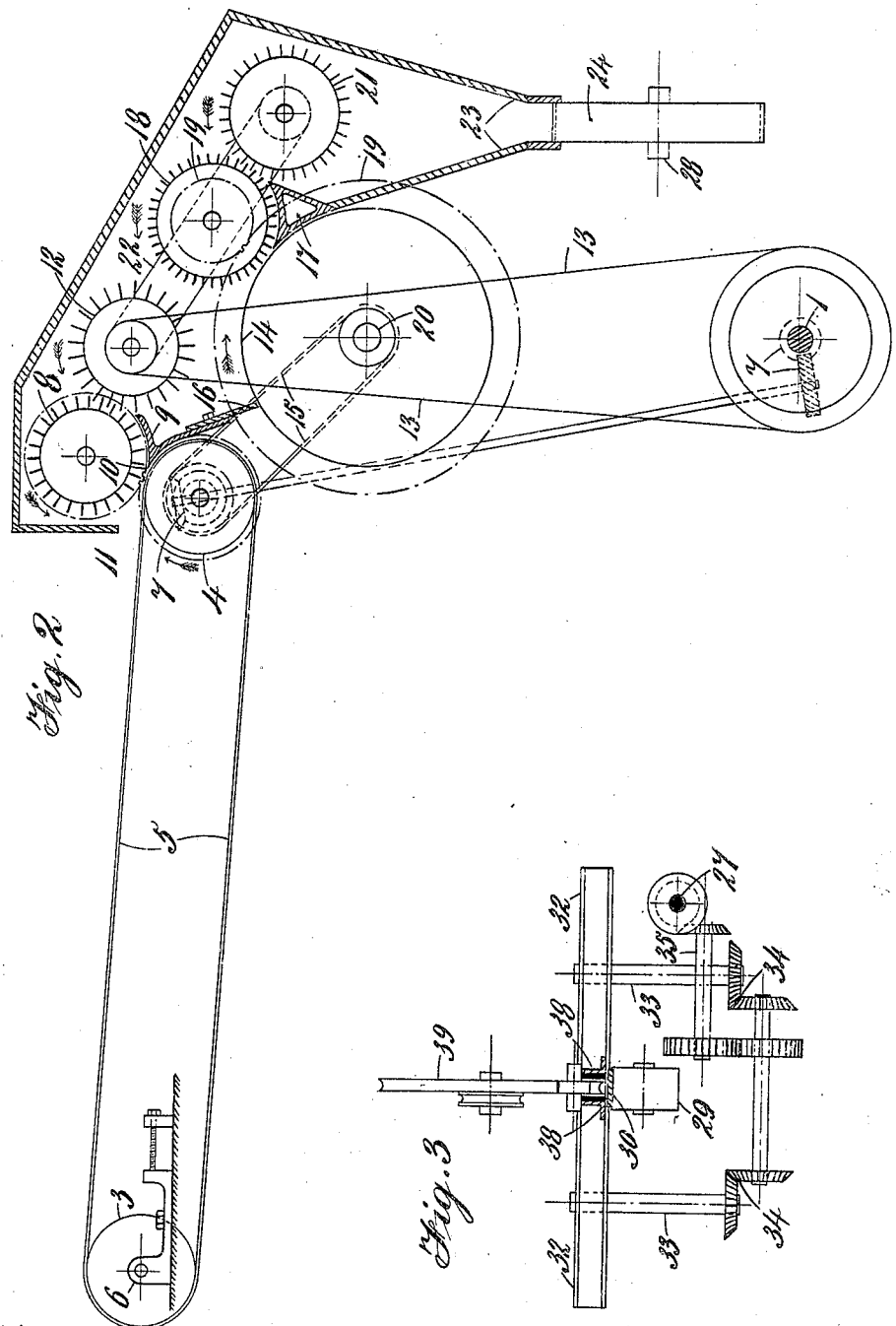
Witnesses.
W. Max. Duvall.
Martin T. Fisher.
Inventor,
George Tickner, Jr.
by Wilkinson & Fisher,
Attys.

No. 828,786. PATENTED AUG. 14, 1906.
G. TICKNER, JR.
APPARATUS FOR MAKING CIGARETTES.
APPLICATION FILED AUG. 14, 1905.
9 SHEETS—SHEET 3.
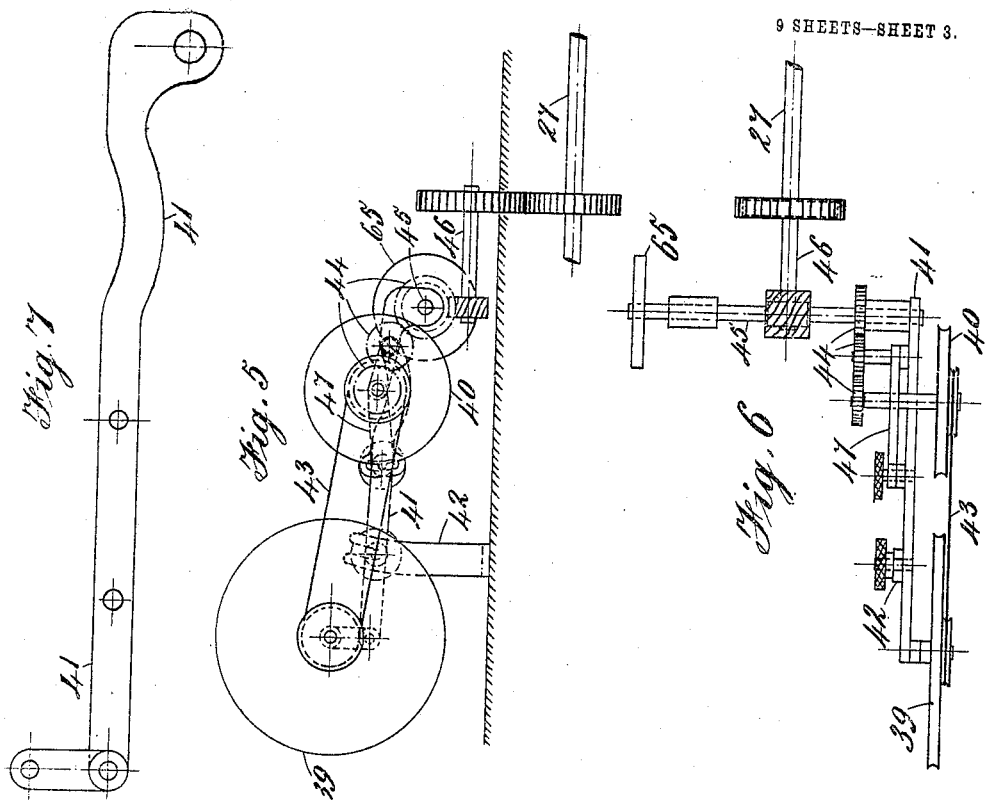
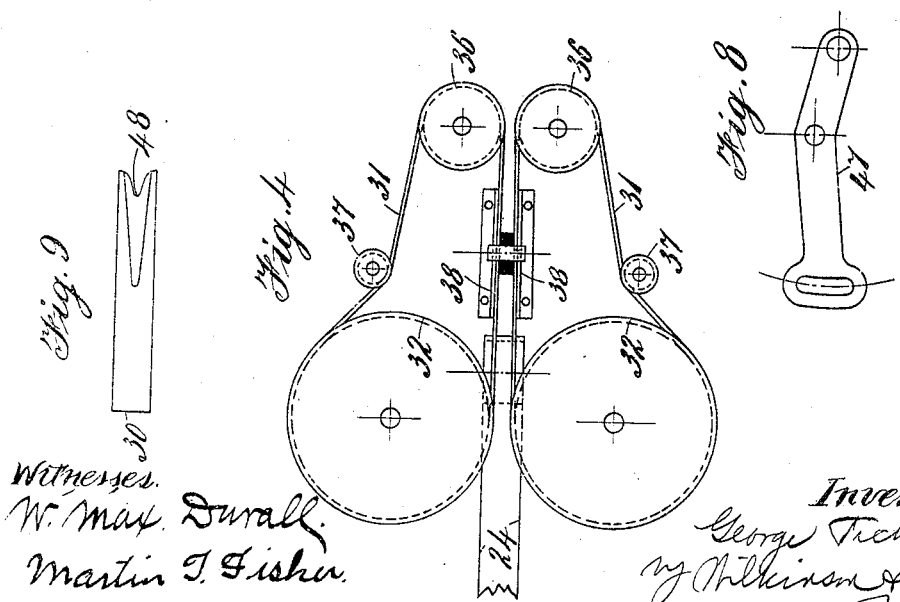
Witnesses.
W. Max Durall.
Martin T. Fisher.
Inventor.
George Tickner, Jr.
by Wilkinson & Fisher
Attys.

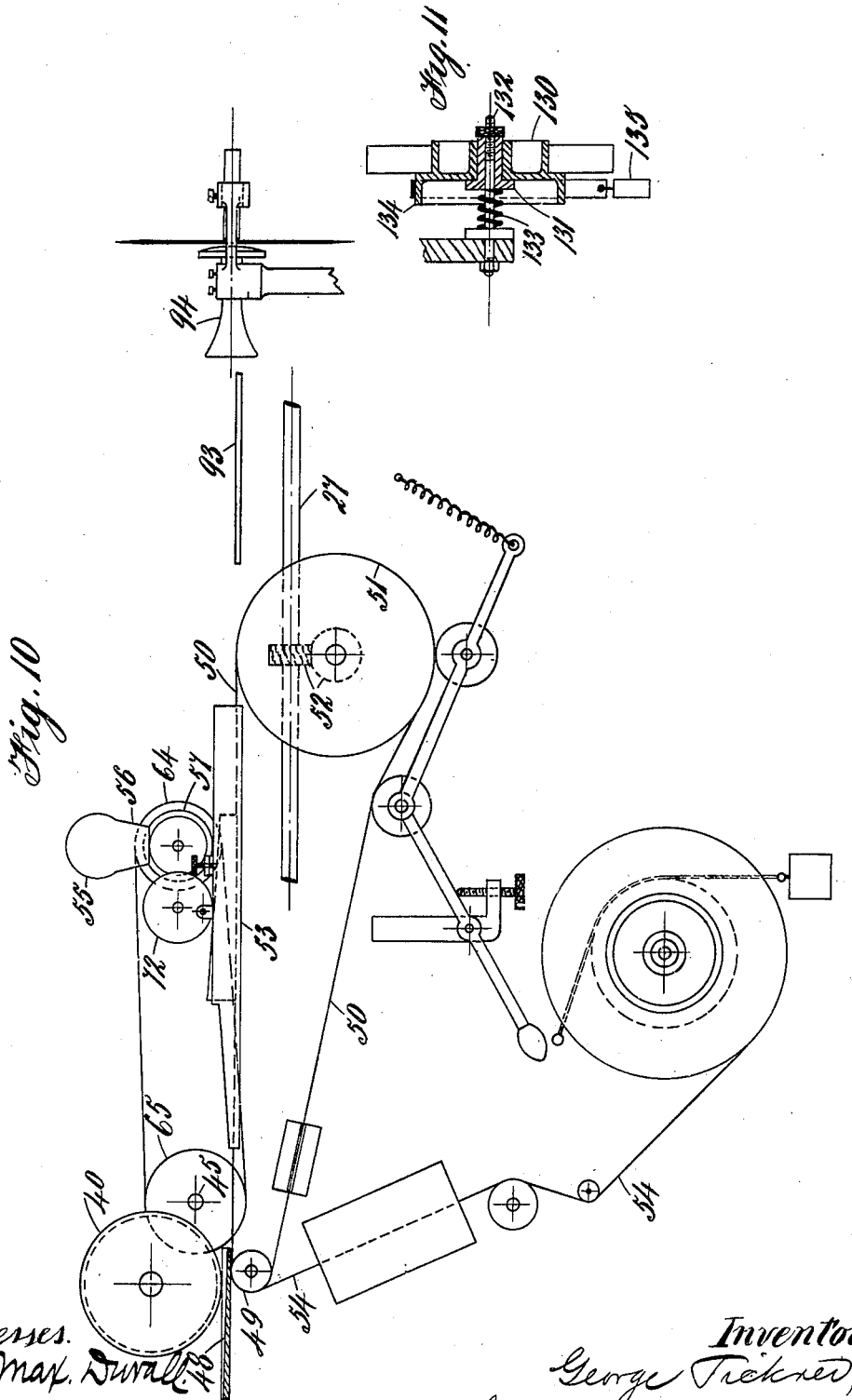

No. 828,786. PATENTED AUG. 14, 1906.
G. TICKNER, Jr.
APPARATUS FOR MAKING CIGARETTES.
APPLICATION FILED AUG. 14, 1905.
9 SHEETS—SHEET 5.
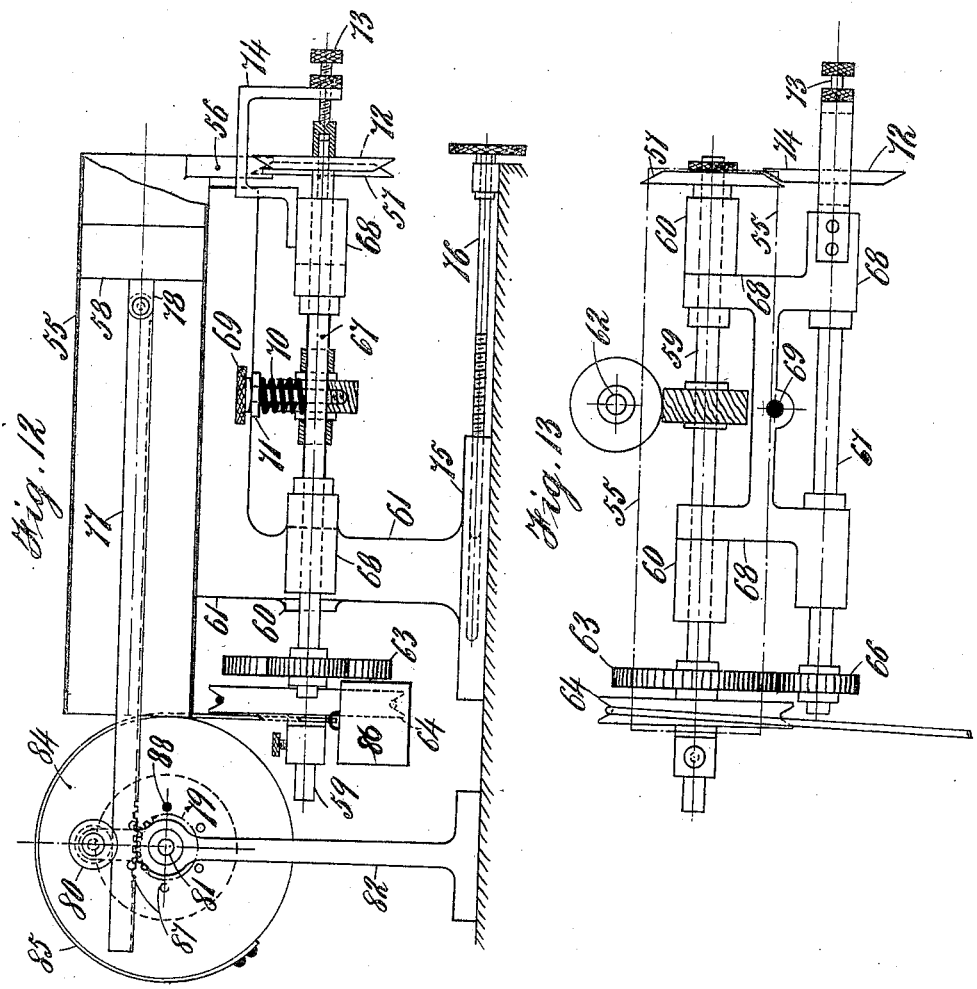
Witnesses.
W. Max. Duvall.
Martin T. Fisher.
Inventor.
George Tickner, Jr.

No. 828,786. PATENTED AUG. 14, 1906.
G. TICKNER, Jr.
APPARATUS FOR MAKING CIGARETTES.
APPLICATION FILED AUG. 14, 1905.

9 SHEETS—SHEET 6.

Witnesses:
W. Max. Durall.
Martin J. Fisher.

Inventor.
George Tickner, Jr.
by Wilkinson & Fisher
Attys.

No. 828,786. PATENTED AUG. 14, 1906.
G. TICKNER, Jr.
APPARATUS FOR MAKING CIGARETTES.
APPLICATION FILED AUG. 14, 1905.
9 SHEETS—SHEET 7.
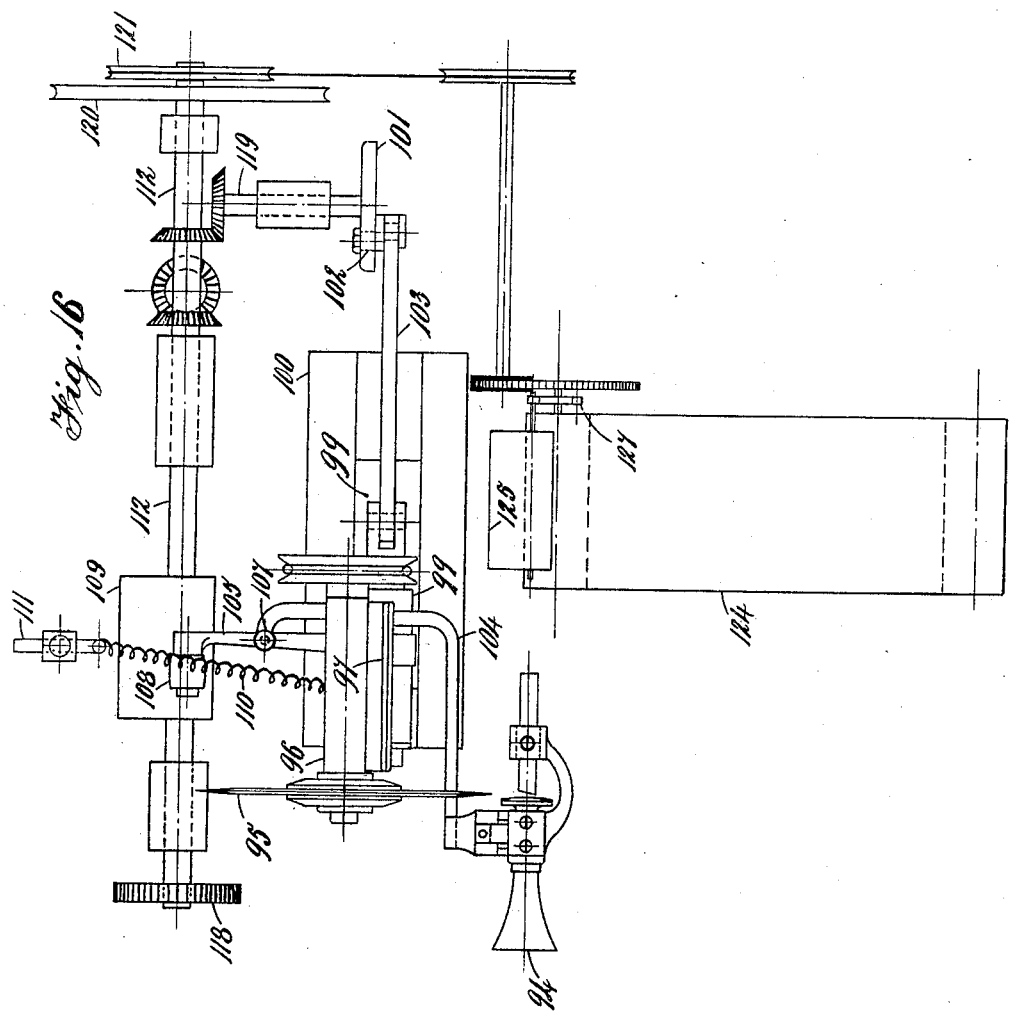

No. 828,786. PATENTED AUG. 14, 1906.
G. TICKNER, Jr.
APPARATUS FOR MAKING CIGARETTES.
APPLICATION FILED AUG. 14, 1905.
9 SHEETS—SHEET 8.
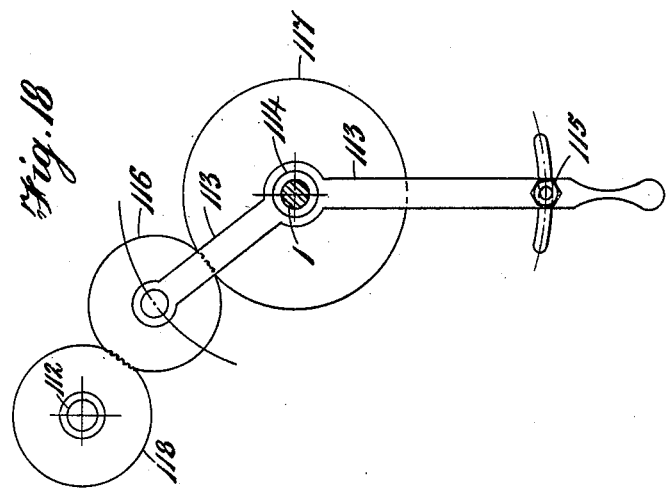
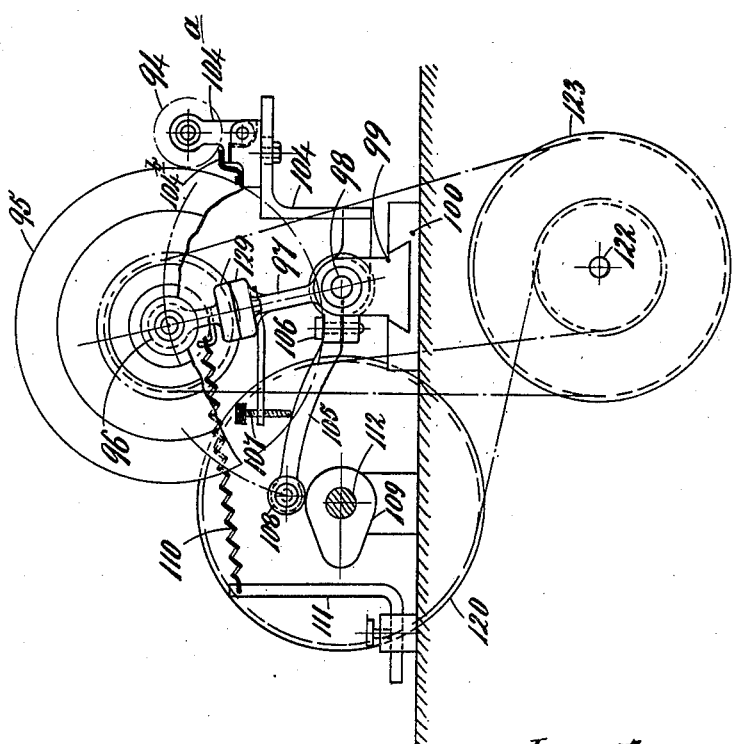
Witnesses.
W. Max. Duvall.
Martin T. Fisher.
Inventor.
George Tickner, Jr.,
by Wilkinson & Fisher,
Attys.

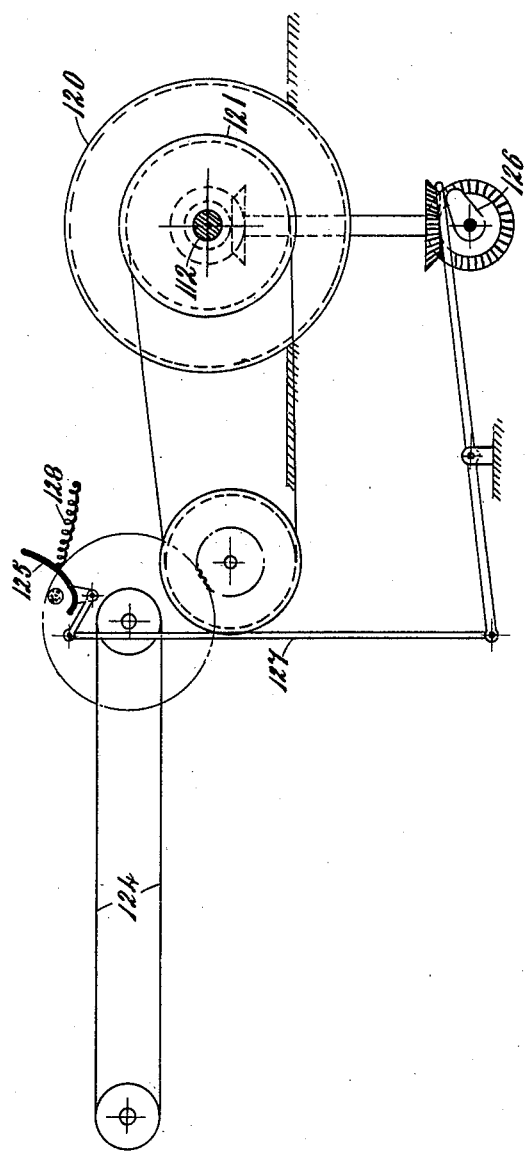

UNITED STATES PATENT OFFICE.

GEORGE TICKNER, JR., OF COUNTY OF MIDDLESEX, ENGLAND.

APPARATUS FOR MAKING CIGARETTES.

No. 828,786.  Specification of Letters Patent.  Patented Aug. 14, 1906.

Application filed August 14, 1905. Serial No. 274,166.

*To all whom it may concern:*

Be it known that I, GEORGE TICKNER, Jr., a subject of the King of Great Britain, residing at 351 Old Ford road, in the county of Middlesex, England, have invented new and useful Improvements in Machinery or Apparatus for Making Cigarettes, of which the following is a specification.

My invention relates to machinery or apparatus for making automatically and upon a large scale ordinary cigarettes.

The accompanying drawings are in illustration of my invention.

Figure 1:
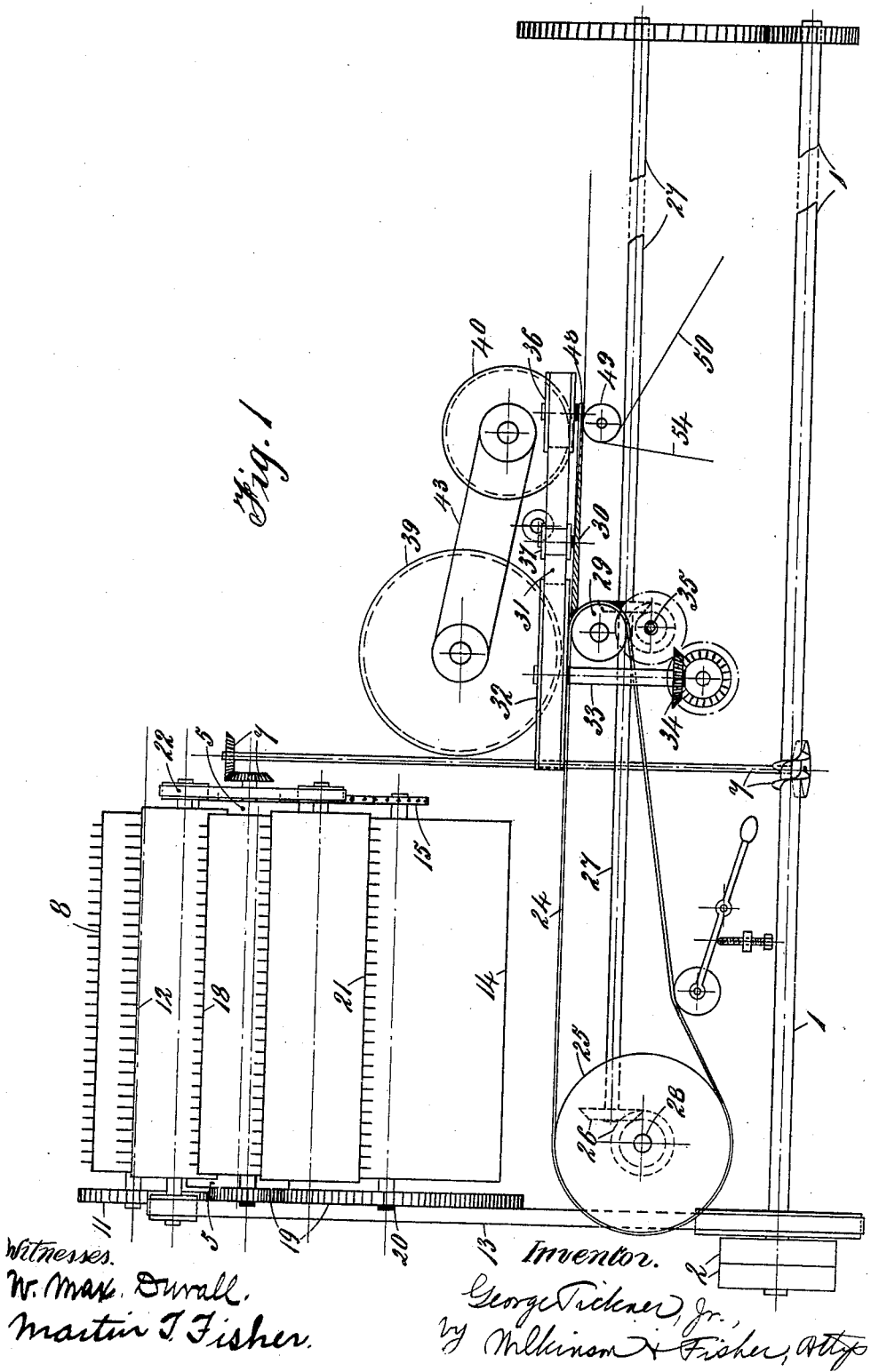
Figure 14:
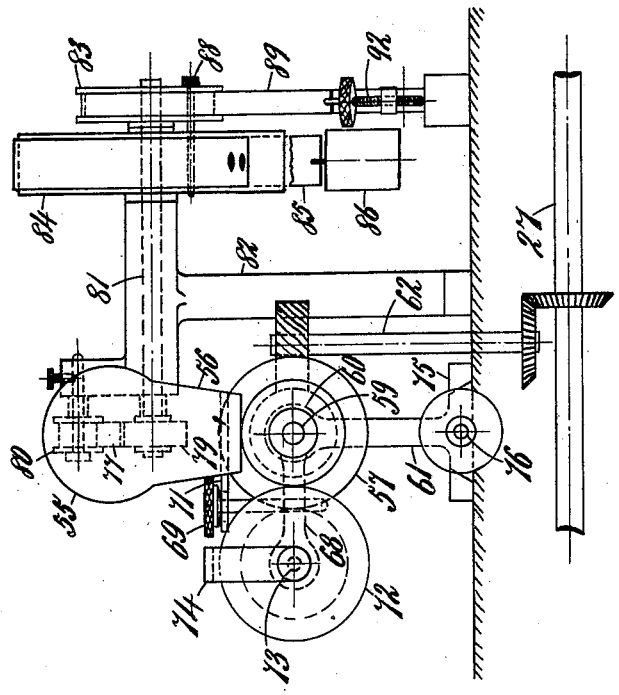
Figure 15:
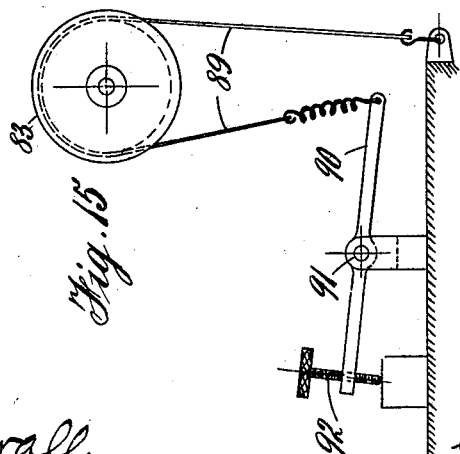

Figure 1 is a side elevation showing the more important parts of the machine. Fig. 2 is an end view of the same. Fig. 3 is a detail view showing the guiding-bands. Fig. 4 is a plan of the same. Fig. 5 is a side elevation of the compressing device. Fig. 6 is a plan of the same. Figs. 7, 8, and 9 are details of different parts of the machine. Fig. 10 is a side elevation of the paper feeding and folding devices. Fig. 11 is a detail view of parts of the same. Fig. 12 is a side elevation, partly in section, of the pasting device. Fig. 13 is a plan of part of the same. Fig. 14 is an end view of Fig. 12. Fig. 15 shows a detail view of part of the same. Fig. 16 is a plan of the cutting device. Fig. 17 is an end view of the same. Fig. 18 is a detail view of part of the same. Fig. 19 is a side view of the device for removing the finished cigarettes.

My improved machine is carried upon a sufficiently solid and firm base or foundation, upon which are fixed parallel standards or frames at a suitable distance apart, in the lower part of which are fixed or formed bearings in which revolves a horizontal driving-shaft 1, which can be set in revolution at the required speed by steam or other convenient power.

In the upper part of the machine, Figs. 1 and 2, are arranged two parallel drums or rollers 3 4, parallel with the main shaft 1, round which passes an endless band 5, of leather or other suitable flexible material. The bearings 6 of one of these rollers 3 are made adjustable, so that the endless band or belt 5 can be kept properly stretched, and the other roller 4 is set in revolution at the required speed by means of toothed wheels and gear 7, connected with the main driving-shaft 1 below. A roller 8, revolving at the same speed as the band 5 and having its circumference provided with pins or wires, as shown, is arranged in such a position that tobacco supplied to it is fed by it over a delivery-plate consisting of an adjustable casting 9, having a curve approximately that of the roller and having a sharp edge 10, over which the tobacco is fed uniformly and evenly. This roller 8 is driven from the spindle of the band-roller 4 by suitable toothed gear 11, and a similar roller 12, driven by a band 13 from the main shaft 1, cards the separate pieces of tobacco and delivers them over the edge of the casting and throws the tobacco down upon a revolving drum 14, driven by gear 15 from the spindle of the band-roller 4, already described. The drum 14 is made to revolve at a somewhat quicker speed than the feed-band 5, so as to give a better distribution of the tobacco, which is prevented from falling off the back of the drum by a guard 16. In front of the drum 14 is fixed an adjustable scraper or blade 17 close to the surface of the drum 14 and curved to correspond with a collecting-roller 18, having pins or wires upon its circumference and driven at the proper speed by gear 19 from the drum-spindle 20. This roller 18 takes off the tobacco from the drum 14 and carries it to the edge of the blade or scraper 17, from which it is picked up by a second wired or carding roller 21, driven by a band 22 from a pulley on the spindle of the first carding-roller 12. This last-mentioned roller 21 throws the tobacco down a chute or guide 23 onto a narrow horizontal endless band 24, of leather or other suitable material, running at right angles to the drum and parallel with the main driving-shaft 1.

The wheel 25, which drives one of the rollers round which the band 24 passes, is driven by toothed gear 26 on the shaft 27, parallel with and driven by the main shaft 1, which drives a transverse spindle 28, which actuates the roller, and the other end of the narrow band 24 passes round a small roller 29, adjoining which is fixed an adjustable knife-blade or sharp-edged casting 30, by which the tobacco is removed from the band 24. The tobacco is carried over the casting 30 by two narrow parallel endless bands 31, running vertically on edge around horizontal pulleys 32 at one end, fixed upon vertical spindles 33 and driven by toothed gear 34 from a horizontal spindle 35, which is itself driven by the shaft 27. The other ends of the vertical endless bands 31 (see Figs. 3 and 4) pass round two smaller pulleys 36, the position of which can be regulated to adjust the width of the space between the bands 31, and each of the bands is kept tight by an adjustable guiding-pulley 37, the bands being kept parallel by adjustable angle pieces or guides 38, fixed to the frame. The two vertical bands 31 described are narrow, and arranged so as to revolve vertically between them are two pulleys 39 40, (see Figs. 1, 5, and 6,) grooved round their circumference and carried upon a swinging arm 41, which is held in position by a bracket 42, one end of which is slotted to allow the arm to be adjusted laterally, while the other end is fixed to the bed of the machine. One of the two grooved wheels 39 is arranged at a sufficient distance in advance of the other, 40, and the rope of tobacco passing along the horizontal band 24 and between the two vertical bands 31 is compressed and rounded by the hemispherical groove in the circumferences of the two vertical wheels 39 40, which press upon it as it is carried forward. The tobacco between the wheels 39 and 40 is prevented from rising by a light roller above it. (See Figs. 1, 3, and 4.) The spindles of the grooved wheels are suitably geared together at 43, and the second of them, 40, is driven at the proper speed by toothed gear 44 from a horizontal spindle 45 at right angles to the main shaft and driven by a spindle 46 parallel with the main shaft and operated by the same spindle 27 that drives the band-wheel 25. The second vertical grooved wheel 40 is carried by an adjustable bracket 47, fixed and held in position upon the swinging arm 41. This wheel, being adjustable vertically, can be adjusted independently of the first wheel.

Under the second grooved wheel 40 is arranged (see Figs. 1, 9, and 10) a grooved tongue-piece 48, (which may be an extension of the knife-edge 30,) fixed to the frame and lying between the two vertical side bands 31 and having for its object to give a more circular form in cross-section to the rope of tobacco passing along above it. Under the frame or support is arranged (see Fig. 10) a roller 49, over which runs a tape 50, driven by a wheel 51, similar to the band-wheel 25, and itself driven by toothed gear 52 from the same shaft 27. This tape runs through a folding device 53 of the ordinary well-known kind, fixed to an adjustable plate, and the tape 50 carries with it the continuous cigarette-paper 54, in which the tobacco is to be inclosed. The tobacco is delivered upon the paper by the vertical side bands 31, and the paper is wrapped round the tobacco in and by the action of the folder 53, one edge of the paper being pasted as its passes through the folder. The pasting device (see Figs. 12, 13, 14, and 15) for this purpose consists of a horizontal tube 55, having a bell-mouth 56 of sufficient capacity fixed to the frame of the machine, adjacent to the front end of which revolves a thin disk 57, conical or beveled at its circumference. The paste (or other suitable adhesive material) is forced through the tube and onto the beveled edge of the disk by a plunger 58. This beveled disk 57 is carried upon a horizontal spindle 59 at right angles to the main shaft and turning in bearings 60 in the support 61 for the paste-tube 55. The spindle is driven by suitable gear from a vertical spindle 62, geared to the same shaft 27 that drives the band-wheel.

Upon the back end of the spindle 59 of the paste-wheel or beveled disk are placed two wheels 63 64, fixed together, but running loose upon the spindle, one of the wheels, 63, being a toothed wheel and the other, 64, a band-pulley. These wheels are driven from a band-pulley 65, fixed upon the spindle 45, which drives the second grooved compression-wheel 40, already described. The toothed wheel 63, which forms one of the two combined wheels just described, which run loose upon the spindle of the paste wheel or disk, gears with and drives a small corresponding toothed wheel 66, fixed upon a spindle 67, running in bearings in a swinging bracket 68, held on the bearings of the paste-disk spindle and adjusted by a screw 69 and held steady by a spring 70, permitting an operative yielding movement through which the screw works. A bracket 71, fixed to the support 61 of the paste-tube 55, holds this spring in position. Upon the other end of the spindle 67 is a second bevel-edged wheel or disk 72, the beveled face of which takes the paste from the face of the first disk 57 and pastes the edge of the cigarette-paper. The second or pasting disk 72, just described, can be adjusted to or from the first disk by means of a screw 73, held in position by a bracket 74, coming over in front of the disk and fixed to the swinging bracket 68, already described. The whole of the pasting device works in a slide 75 and can be adjusted nearer to or farther from the cigarette-paper by means of a screw 76.

The plunger 58, which forces out the paste, is worked by means of a toothed rack 77, connected to the plunger by a small cross-head 78, which allows the rack to be lifted when required out of gear with a toothed pinion 79, by which it is driven, so that the plunger can be withdrawn for filling the paste-tube without interfering with the toothed pinion. The rack 77 is kept in gear when at work by a guide-pulley 80. The toothed pinion 79 is fixed upon a horizontal spindle 81 at right angles to the rack 77 and turns in a bearing 82, fixed to the frame of the machine. Upon the other end of this spindle are fitted two wheels 83 and 84, one, 83, fixed and the other, 84, loose, and to the loose wheel 84 is fixed a strap 85, to which is attached a weight 86. In the side of this loose wheel 84 are a number of small holes 87, either of which can be brought opposite to a corresponding hole in the fixed wheel 83, so that if a pin 88, passing through the hole in the fixed wheel 83, is inserted into either of the holes in the loose wheel 84, both wheels are locked together. The weight when released then turns the spindle, which drives the rack. A strap 89 passes over the fixed wheel 83, one end of which is fixed to a suitable part of the machine and the other end to a horizontal lever 90, turning upon a pivot 91 in a bracket fixed to the bed or frame of the machine. The end of the lever to which the strap is fixed can be raised or lowered by a screw 92 in the opposite end of the lever 90. This strap acts as a brake upon the weight, so that the pressure upon the plunger which forces out the paste can be regulated as required.

The cigarette on leaving the folding device passes (see Figs. 16 and 17) over a plate 93 into a movable tube 94, on leaving which it is cut into lengths by a circular blade or knife 95, the spindle of which runs in a horizontal bearing 96, adjustable so that the knife may be fixed exactly in the required position. This bearing is fixed to the outer end of a rocking bracket 97, the lower end of which turns upon a pin 98, fixed to a sliding block 99, which can slide horizontally in guides 100 parallel with the main shaft 1 and has a reciprocating movement given to it by means of a revolving disk 101, having a radial slot in which a crank-pin 102 can be adjusted and fixed, a connecting-rod 103 converting the rotary movement of the crank-pin 102 into the reciprocating movement of the pin 98 in the sliding block 99, the stroke of which can be varied within certain limits by adjusting the crank-pin to suit any desired length of cigarettes. The movable tube 94, through which the cigarettes are delivered, (to be cut into lengths,) is carried upon an arm 104, fixed to the sliding block 99. The tube 94 may be carried upon a pivoted bearing 104$^a$ and kept in place by a spring 104$^b$, so that it can give way if any hard substance should pass in with the tobacco, which might injure the blade.

The object of the reciprocating motion given to the cutting-knife 95 and the tube 94 is that the knife when making its cut may travel longitudinally at the same speed as the cigarette is traveling, as otherwise the end of the cigarette would be pressed against the side of the knife during the cut and injured, and the body of the cigarette would also be liable to distortion.

The rocking bracket 97 has its independent reciprocating movement at right angles to the main shaft, and it is provided with a boss which fits upon the pin 98, described above, and upon this boss is an arm 105, having itself a split boss which enables the arm to grip the boss of the bracket and hold the arm exactly in the proper desired position by means of a screw 106, which tightens the split parts of the bracket. A screw 107, fixed to the bracket and pressing against the arm, enables a perfectly accurate adjustment to be made. At the end of the arm 105 is arranged a roller 108, which presses against a suitable revolving cam 109 and gives the bracket 97 the required movement, and the roller is pressed against the cam by a spring 110, which can be tightened and adjusted by means of an arm 111, attached to the support of the cutting device. The cam 109 is of sufficient length to allow the roller 108 to move backward and forward upon it for a certain distance, and it is fixed upon a horizontal spindle 112, parallel with the main shaft 1 and driven from the latter by variable toothed gear in the following way: A swinging arm 113, Fig. 18, is pivoted at one end upon one of the bearings 114, which carries the main shaft, and the arm can be fixed in any desired position by a screw 115, adjustable in a suitable slot in the frame of the machine. At the other end of the swinging arm 113 is a toothed wheel 116, of convenient diameter, which can revolve freely and gears both with a toothed wheel 117 upon the main shaft 1 and with a toothed wheel 118 upon the cam-spindle 112. A toothed wheel of any desired size can therefore be used upon the cam-spindle and can be changed as desired in order to vary the frequency of the cuts of the cutting-knife, and consequently the lengths of the cigarettes cut off.

The slotted disk 101 is driven by a transverse spindle 119, driven by the cam-spindle 112.

On the cam-spindle 112 are two band-pulleys 120 121, one (120) driving a spindle 122 under the bed of the cutting device, and fixed upon this spindle is the wheel 123, which drives the revolving cutting disk or knife 95. The other wheel (121) on the cam-spindle 112 drives by a band a spindle carried upon the bed of the cutting device, the other end of which spindle drives by means of gear an endless band 124, upon which the cigarettes fall as they are cut off. In order that they may fall perfectly true across the traveling band and to prevent them from falling off, I prefer to arrange a rocking feeder 125, (see Fig. 19,) into which they fall one by one from the cutter. This feeder consists of a curved or concave plate turning upon pivots at its sides and actuated by a cam 126 upon a spindle driven by gear from one of the shafts of the machine in such manner that when the curved plate is at rest the cigarette drops into and lies fairly and squarely across it. The plate is then suddenly tilted up by the action of the cam upon a lever 127 connected with it in such manner that the cigarette is deposited upon the endless band, above which the feeder is arranged. The feeder is brought back to its original position by a spring 128. The finished cigarettes are delivered by the last-described traveling band 124 into any convenient receptacle or place, where they are stored or packed by any suitable mechanism or by hand.

In order that the cutting blade or disk may cut the ends of the cigarettes perfectly square, I prefer to make the oscillating arm 97, which carries it, in two parts, the meeting ends of which are provided with plates or disks 129, which are bolted together, but can also allow a slight turning upon each other, so that a perfect adjustment of the disk may be obtained.

The strip of cigarette-paper is carried upon a flanged roller 130, (see Fig. 11,) running upon a sleeve 131, adjustable endwise upon a spindle 132 by a spring 133, so that the exact position of the paper can be adjusted, and a brake 134, influenced by a weight 135, keeps the paper steady.

The details of the invention may be varied more or less, as may be found desirable to suit varying circumstances.

Having fully described my invention, what I claim, and desire to secure by Letters Patent, is—

1. In a cigarette-machine, the combination of a frame, a pair of parallel drums, an endless band provided with pins thereon, a curved delivery-plate, a carding-roller, a drum adapted to rotate at a greater speed than the endless band, a guard at the back of the drum, an adjustable scraper-blade, a collecting-roller provided with pins, means for driving the same, a second carding-roller adapted to be driven from the spindle of the first carding-roller, a chute for conducting the tobacco to an endless conveyer, said latter conveyer extending at right angles to the drum, and rollers supporting the same driven from the main driving-shaft, a smaller roller at the other end of said conveyer, an adjustable knife for removing tobacco from the band, an intermediate shaft, two parallel narrow endless bands mounted on horizontal pulleys driven by said shaft, adjustable pulleys regulating the width of the space between the vertical bands, a pair of vertical grooved compressing-pulleys mounted in advance of one another revolving between the vertical bands, an adjustable swinging arm supporting the same, a light roller disposed between the grooved pulleys to prevent the tobacco from rising, toothed gear for actuating the grooved pulleys, a folding device, pasting device by which the edge of the cigarette-paper is pasted, said device being adjustable, a movable tube through which the length of cigarette passes, a cutting device comprising a circular knife, carried upon a rocking bracket mounted upon a slide, means for regulating the stroke of said knife, means for varying the frequency of the cuts of the cutting-knife, means for operating the same, and a conveyer upon which the finished cigarettes are delivered, substantially as described.

2. The combination of a narrow horizontal flexible band, a roller supporting said band, driving means therefor, a smaller roller, an adjustable blade mounted adjacent thereto, a pair of endless parallel bands, vertical spindles supporting horizontal pulleys, adjustable pulleys adjacent thereto, a swinging arm provided with a slotted bracket, a light pressure-roller, an adjustable bracket supported upon the swinging arm, and a grooved fork member disposed between the vertical side bands, substantially as set forth.

3. In a cigarette-machine, the combination of a pasting device, a cutting device, a frame carrying two parallel drums, provided with pins, a carding-roller, an adjustable scraper, a collecting-roller, a second carding-roller, a chute, a narrow endless flexible band disposed adjacent to said chute, an adjustable knife-edge for removing the tobacco from the band, a pair of parallel narrow endless bands mounted on horizontal pulleys, said pulleys being adjustable to vary the space between the vertical bands, an adjustable guide-pulley, fixed guides, a pair of vertical grooved compressing-pulleys revolving between the vertical bands, an adjustable swinging arm, a light roller disposed between the grooved pulleys to prevent the tobacco from rising, a folding device mounted upon the adjustable plate, provided with a tape running through the same, carrying continuous cigarette-paper, and means for operating said mechanism, substantially as described.

In witness whereof I have hereunto set my hand in the presence of two witnesses.

GEORGE TICKNER, JNR.

Witnesses:
ARTHUR E. EDWARDS,
ALEX. N. FAREWELL.